(12) United States Patent
White et al.

(10) Patent No.: US 9,625,738 B2
(45) Date of Patent: Apr. 18, 2017

(54) HYBRID CONTACT LENS

(71) Applicant: Synergeyes, Inc., Carlsbad, CA (US)

(72) Inventors: Neal White, San Marcos, CA (US); Christopher Jennings, Escondido, CA (US); Kevin Pelka, Carlsbad, CA (US)

(73) Assignee: SYNERGEYES, INC., Carlsbad, CA (US)

( * ) Notice: Subject to any disclaimer, the term of this patent is extended or adjusted under 35 U.S.C. 154(b) by 0 days.

(21) Appl. No.: 14/598,963

(22) Filed: Jan. 16, 2015

(65) Prior Publication Data

US 2015/0219927 A1   Aug. 6, 2015

Related U.S. Application Data

(60) Provisional application No. 61/934,671, filed on Jan. 31, 2014.

(51) Int. Cl.
*G02C 11/00* (2006.01)
*G02C 7/04* (2006.01)
*G02C 7/10* (2006.01)

(52) U.S. Cl.
CPC ............... *G02C 7/049* (2013.01); *G02C 7/10* (2013.01); *G02C 11/00* (2013.01)

(58) Field of Classification Search
CPC .......... G02C 7/049; G02C 11/00; G02C 7/10; G02C 7/04; G02C 7/08; G02C 7/048; G02B 3/14; A61F 2/1635
USPC ..................................................... 351/159.04
See application file for complete search history.

(56) References Cited

U.S. PATENT DOCUMENTS

| | | |
|---|---|---|
| 3,594,074 A | 7/1971 | Rosen |
| 3,973,837 A | 8/1976 | Page |
| 3,973,838 A | 8/1976 | Page |
| 4,166,255 A | 8/1979 | Graham |
| 5,434,630 A | 7/1995 | Bransome |
| 7,018,039 B2 | 3/2006 | Legerton et al. |
| 7,097,301 B2 | 8/2006 | Legerton et al. |
| 7,104,648 B2 | 9/2006 | Dahi et al. |
| 7,163,292 B2 | 1/2007 | Dahi et al. |
| 7,322,694 B2 | 1/2008 | Dahi et al. |
| 7,748,844 B2 | 7/2010 | Lai |
| 8,408,698 B2 | 4/2013 | Legerton |
| 8,770,744 B2 | 7/2014 | Legerton |
| 9,256,082 B2 | 2/2016 | Legerton |

(Continued)

FOREIGN PATENT DOCUMENTS

| | | |
|---|---|---|
| EP | 0042679 A2 | 12/1981 |
| WO | WO 2004/015460 A2 | 2/2004 |

OTHER PUBLICATIONS

International Search Report and Written Opinion mailed on May 4, 2015 in PCT Application No. PCT/US2015/012308.

*Primary Examiner* — Bumsuk Won
*Assistant Examiner* — Henry Duong
(74) *Attorney, Agent, or Firm* — Knobbe, Martens, Olson & Bear LLP (57) ABSTRACT

A hybrid contact lens has a rigid gas permeable (RGP) central portion and a soft flexible portion that extends outward from the RGP central portion. The soft flexible portion defines the posterior surface and base curve of the hybrid contact lens that contacts a user's cornea, such that the RGP central portion does not contact the user's cornea while wearing the hybrid contact lens. The hybrid contact lens can be a single lens system with one optical power, or a dual lens system with two different optical powers.

17 Claims, 6 Drawing Sheets

(56) References Cited

U.S. PATENT DOCUMENTS

2007/0291224 A1 12/2007 Lai
2013/0184554 A1 7/2013 Elsheikh et al.
2014/0268022 A1 9/2014 Legerton

HYBRID CONTACT LENS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Application No. 61/934,671, filed Jan. 31, 2014, which is incorporated herein by reference in its entirety and should be considered a part of this specification.

BACKGROUND

Field

The present invention related to contact lenses, and more particularly to hybrid hard-soft contacts lenses.

Description of the Related Art

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in fabrication. Hard contact lenses, which may provide the platform to achieve the results of spectacles, are not as comfortable as soft contacts and lack the necessary positional stability on the eye.

Therefore, there exists a need for a hybrid hard-soft contact lens that can provide a platform for a corrective prescription and also provide the comfort of soft contact lenses.

SUMMARY

In accordance with one aspect of the present invention, a hybrid contact lens is provided. The hybrid contact lens comprises a rigid gas permeable central portion and a gas permeable flexible portion that extends outward from the RGP central portion. The gas permeable flexible portion defines the entire posterior surface and the base curve of the hybrid contact lens, such that during use the gas permeable flexible portion contacts the user's cornea and the RGP central portion does not contact the user's cornea.

In accordance with another aspect of the present invention, the hybrid contact lens can optionally be a single lens system with one optical power, or a dual lens system with two different optical powers.

In accordance with another aspect of the invention, a hybrid contact lens is provided. The lens comprises a lens body having a rigid gas permeable (RGP) portion disposed generally at the center of the lens body, the RGP portion having a posterior surface defined by a base curve. The lens body also has a flexible portion extending outwardly from the RGP portion and defining an outer edge of the lens body, wherein the flexible portion extends over the posterior surface of the RGP portion and defines a posterior surface and base curve of the lens body configured to contact a user's eye when wearing the hybrid contact lens, such that the RGP portion does not contact the user's eye when wearing the hybrid contact lens.

In accordance with another aspect of the invention, a hybrid contact lens is provided. The lens comprises a lens body having a rigid gas permeable (RGP) portion disposed generally at the center of the lens body, the RGP portion having a posterior surface defined by a base curve. The lens body also has a flexible portion extending outwardly from the RGP portion and defining an outer edge of the lens body, the flexible portion having a section that extends over the posterior surface of the RGP portion, the flexible portion defining a posterior surface and base curve of the lens body configured to contact a user's eye when wearing the hybrid contact lens, such that the RGP portion does not contact the user's eye when wearing the hybrid contact lens. A ratio of a thickness of the RGP portion relative to a thickness of the section of the flexible portion of the hybrid contact lens that is disposed over the posterior surface of the RGP portion is at least about 2 to 1.

In accordance with another aspect of the invention, a hybrid contact lens is provided. The lens comprises a lens body having a rigid gas permeable (RGP) portion disposed generally at the center of the lens body, the RGP portion having a posterior surface defined by a base curve. The lens body also has a flexible portion extending outwardly from the RGP portion and defining an outer edge of the lens body, the flexible portion having a section that extends over the posterior surface of the RGP portion, the flexible portion defining a posterior surface and base curve of the lens body configured to contact a user's eye when wearing the hybrid contact lens, such that the RGP portion does not contact the user's eye when wearing the hybrid contact lens. An optical, non-optical or medical device interposed between the posterior surface of the RGP portion and said section of the flexible portion that extends over the posterior surface of the RGP portion, so as to be encapsulated between the RGP portion and the flexible portion.

DETAILED DESCRIPTION

Figure 1:
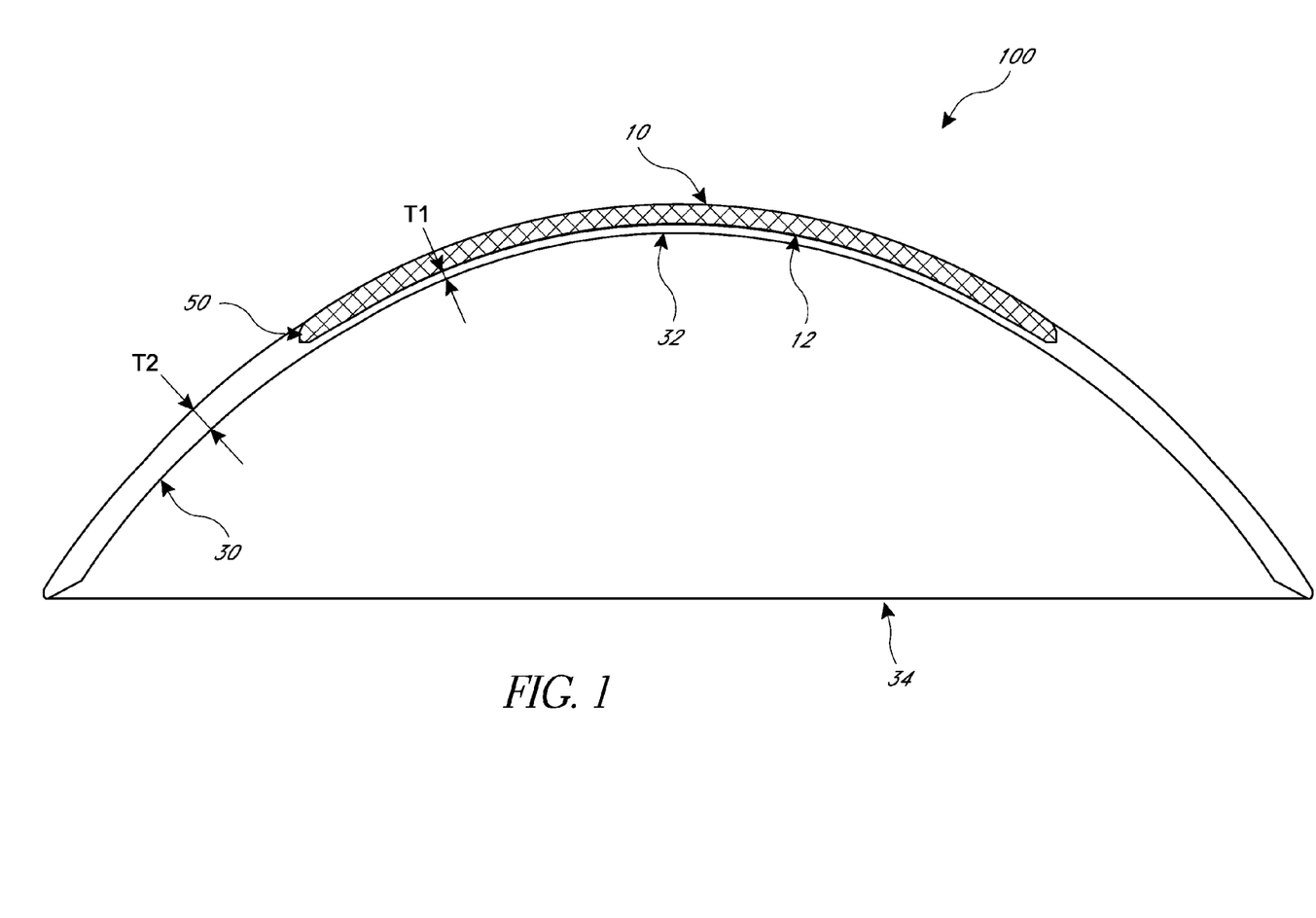
FIG. 1 shows a schematic cross-sectional view of one embodiment of a hybrid contact lens.

FIG. 1 shows a schematic cross-sectional view of one embodiment of a hybrid contact lens 100. Though FIG. 1 only shows a cross-section, one of skill in the art will recognize that said cross-sectional view, when rotated 360 degrees about its axis defines the entire lens 100. The lens 100 can have a rigid gas permeable (RGP) portion 10 and a flexible portion 30. In the illustrated embodiment, the RGP portion 10 can be disposed generally at the center of the hybrid contact lens 100 and the flexible portion 30 can extend outwardly from the RGP portion 10 and define an outer edge 34 of the hybrid contact lens 100. The flexible portion 30 can also extend over an entire posterior surface 12 of the RGP portion 10 so that the flexible portion defines the posterior surface 32 and base curve of the hybrid contact lens 100. The flexible portion 30 can optionally be hydrophilic.

The hybrid contact lens 100 can have a junction 50 defined between the RGP portion 10 and the flexible portion 30. Further details on the geometry of the junction 50 can be found in U.S. Pat. Nos. 7,097,301, 7,163,292, 7,104,648, and 7,322,694, which are incorporated herein by reference in their entirety and should be considered a part of this specification.

The RGP portion 10 can be made of suitable contact materials, such as those disclosed in U.S. Pat. Nos. 7,097,301, 7,163,292, 7,104,648, and 7,322,694 incorporated by reference. In one embodiment, the RGP portion 10 can be made of Petrafocon A material. The flexible portion 30 can be made of suitable contact lens materials, such as a Silicon Hydrogel material and/or those disclosed in U.S. Pat. Nos. 7,097,301, 7,163,292, 7,104,648, and 7,322,694 incorporated by reference. In one embodiment, the flexible portion 30 can be made of HEM-larafilcon A material.

In one embodiment, the RGP portion 10 can have a gas permeability Dk value of greater than 30 barrer (i.e., greater than $30 \times 10^{-11}$ (cm$^2$/sec)(mL O$_2$)/(mL×mm Hg)), such as between 30-250 barrer. In another embodiment, the RGP portion 10 can have a gas permeability Dk value of greater than 100 barrer, such as between 100-150 barrer. In still another embodiment, the RGP portion 10 can have a gas permeability Dk value of about 130 barrer.

In one embodiment, the flexible portion 30 can have a gas permeability Dk value of greater than 30 barrer (i.e., greater than $30 \times 10^{-11}$ (cm$^2$/sec)(mL O$_2$)/(mL×mm Hg)). In another embodiment, the flexible portion 30 can have a gas permeability Dk value of greater than 50 barrer, such as between 50-100 barrer. In still another embodiment, the flexible portion 30 can have a gas permeability Dk value of about 80 barrer.

In one embodiment, the flexible portion 30 defines a section 31 with thickness T1 adjacent the posterior surface 12 of the RGP portion 10, so that said thickness T1 defines the section of the flexible portion 30 that extends posterior of the RGP portion 10. In one embodiment, the thickness T1 can be between about 10-350 microns, such as between 50-100 microns. In another embodiment, the thickness T1 can be between 50-75 microns, such as about 50 microns. However, in still other embodiments, the thickness T1 can be less than 50 microns. The hybrid contact lens 100 can have an RGP portion 10 with a thickness of between about 25 microns and about 500 microns, and a flexible portion with a thickness of between about 25 microns and about 500 microns, so that the hybrid contact lens 100 can have a total thickness T2 of between about 50 microns and about 1000 microns, such as about 300 microns. In another embodiment, the hybrid contact lens 100 can have a total thickness T2 of about 350 microns. The RGP portion 10 can have a thickness T3 equal to the total thickness T2 minus the thickness T1 of the flexible portion 30 adjacent the posterior surface 12 of the RGP portion 10.

EXAMPLES

In the following examples, various samples of hybrid contact lenses 100 were made using the methods described herein. The examples highlight the performance of such lenses, each having a different thickness for the RGP portion 10 and flexible portion 30 in achieving a desired base curve and power for the lens design. These examples are discussed for illustrative purposes and should not be construed to limit the embodiments of the invention.

| Test No. | Desired Base Curve (mm) | Desired Power | Total lens thickness T2 (μm) | Flexible portion layer T1 thickness (μm) | RGP thickness T3 = T2 − T1 (μm) | Ratio T3/T1 | Result |
|---|---|---|---|---|---|---|---|
| 1 | 7.5 | −3.00 | 240 | 100 | 140 | 1.4 | Fail |
| 2 | 7.5 | −3.00 | 200 | 50 | 150 | 3.0 | Good |
| 3 | 7.5 | −3.00 | 200 | 150 | 50 | 0.33 | Fail |
| 4 | 7.5 | −3.00 | 290 | 50 | 240 | 4.8 | Good |
| 5 | 7.5 | −3.00 | 340 | 50 | 290 | 5.8 | Good |

Through the testing noted above, Applicant discovered that the ratio of the thickness T3 of the RGP portion 10 to the thickness T1 of the flexible portion adjacent the posterior surface 12 of the RGP portion 10 is an important variable. Applicant further discovered that to achieve desired lens design parameters, the ratio of the thickness of the RGP portion 10 to the thickness T1 of the flexible portion adjacent the posterior surface 12 of the RGP portion 10 has to be at least 2 to 1 (such as 3 to 1, 4 to 1, 5 to 1, 6 to 1, etc.).

Figure 1A:
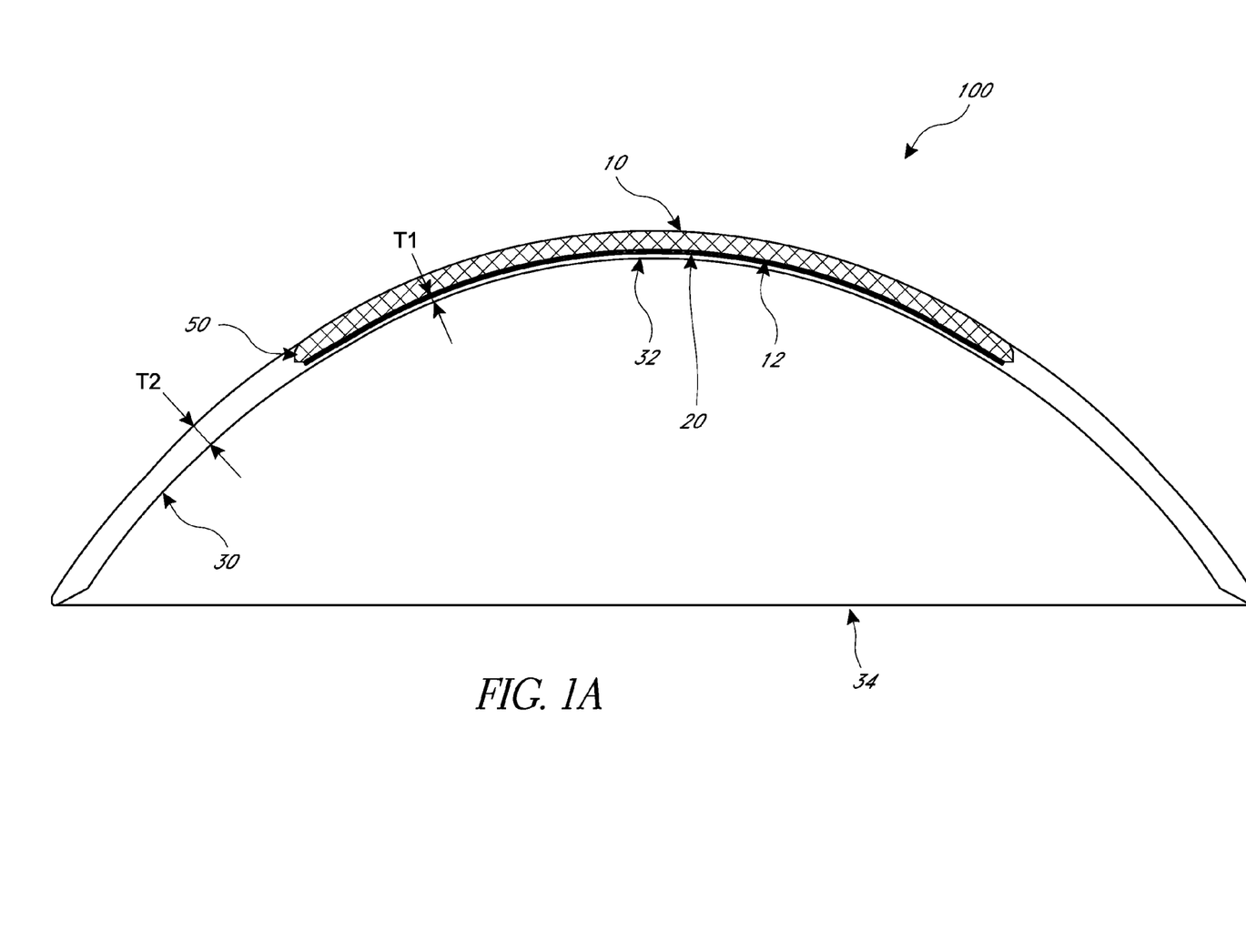
FIG. 1A shows a schematic cross-sectional view of another embodiment of a hybrid contact lens.

In some embodiments, the hybrid contact lens 100 can optionally include an optical, non-optical, or medical device encapsulated between the RGP portion 10 and the flexible portion 30. As shown in FIG. 1A, a device 20 can be interposed or encapsulated between the posterior surface 12 of the RGP portion 10 and the section 31 of the flexible portion 30 that extends over the posterior surface 12. Though FIG. 1A only shows a cross-sectional view of the lens 100, one of skill in the art will recognize that the features shown in FIG. 1A extend about the axis of the lens 100 so that the RGP portion 10 and flexible portion 30, as well as the device 20 can have a substantially circular profile when the lens 100 is viewed from above. That is, though FIG. 1A only shows a cross-section, one of skill in the art will recognize that said cross-sectional view, when rotated 360 degrees about its axis defines the entire lens 100. Further, one of skill in the art will recognize that the hybrid contact lens 100 shown in FIG. 1A can be manufactured using the same process described below, and only adds the additional step of incorporating the device 20 between posterior surface 12 of the RGP portion 10 and the section 31 of the flexible portion 30.

In one embodiment, the device 20 can be an optical device, such as a lens or filter. In another embodiment, the device 20 can be a non-optical device, such as colored element that provides for a colored contact lens and which advantageously avoids the need to paint a surface of the contact lens 100 to provide the color effect, and therefore inhibits possible leeching of ink into the eye. In another embodiment, the device 20 can be a medical device to measure or detect/monitor one or more health parameters of the user. For example, in one embodiment, the sensor can be a pressure sensor. In another embodiment, the sensor can sense a quality of the tear fluid in the user's eye.

In one embodiment the posterior surface 12 of the RGP portion 10 can define a single optical zone (e.g., having a single optical power). In another embodiment, the posterior surface 12 of the RGP portion 10 can define multiple optical zones having multiple optical powers (e.g., dual optical zones having two optical powers). In the embodiment where the RGP portion 10 defines a single optical zone, the base curve of the posterior surface 12 of the RGP portion 10 and the base curve of the posterior surface 32 of the flexible portion 30 can be substantially the same (e.g., identical). In the embodiment where the RGP portion 10 defines multiple optical zones, the base curve of the posterior surface 12 of the RGP portion 10 and the base curve of the posterior surface 32 of the flexible portion 30 can be different. Further discussion of multifocal zones in a hybrid contact lens can be found in U.S. Pat. No. 7,018,039, which is incorporated by reference in its entirety and should be considered a part of this specification.

Figure 2:
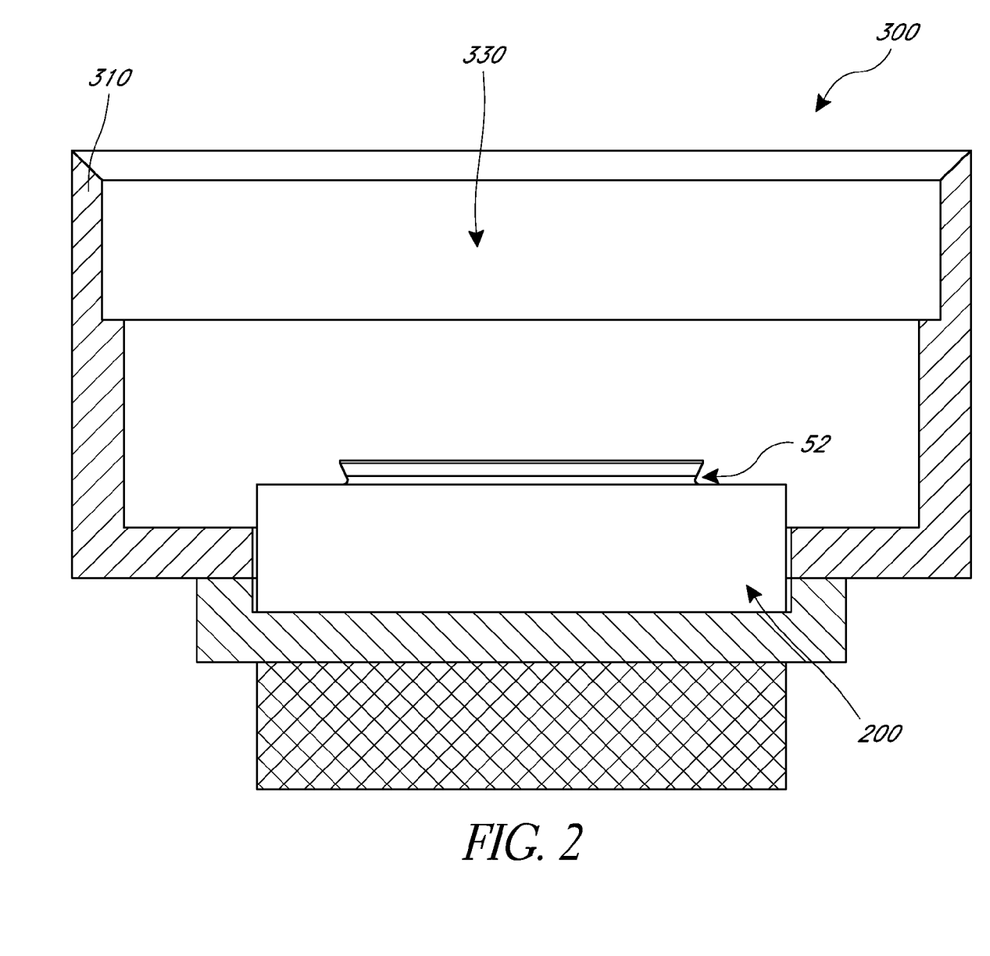
FIG. 2 shows one step in a manufacturing process of the hybrid contact lens of FIG. 1.

FIGS. 2-5 show several steps in one embodiment of a manufacturing process for making the hybrid contact lens 100. In the illustrated embodiment, the manufacturing process can be a casting process. As shown in FIG. 2, an RGP button 200 can be attached to a cup 300 having a cup body 310 that defines a cavity 330. The RGP button 200 can be attached to the cup 300 with an adhesive. The RGP cup 200 can define a junction surface 52 that will form part of the junction 50 of the hybrid contact lens 100. In the illustrated embodiment, the cavity 330 is empty. FIG. 2 shows a cross-section of the cup 300, but one of skill in the art will recognize that said cross-sectional view, when rotated 360 degrees about its axis defines the entire cup 300.

Figure 3:
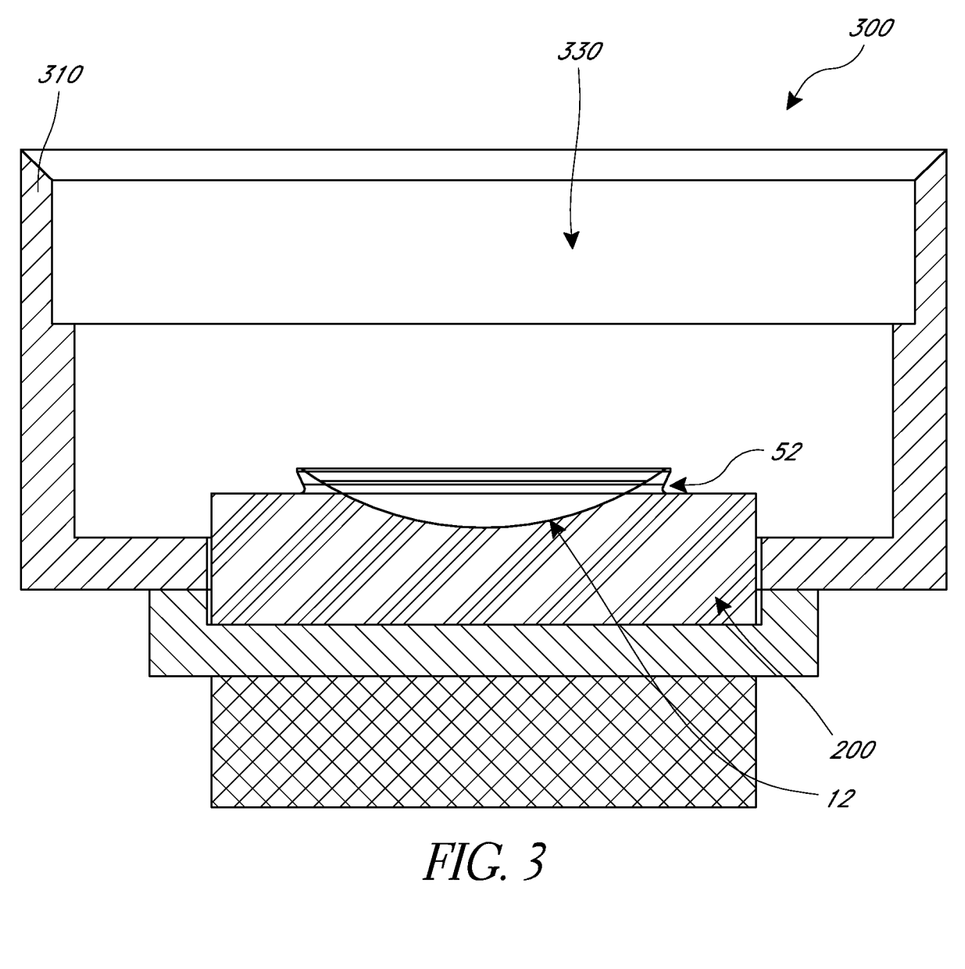
FIG. 3 shows another step in the manufacturing process of the hybrid contact lens of FIG. 1.

With reference to FIG. 3, the posterior surface or base curve 12 can be machined in the RGP button 200. For example, a lathe can be used to machine the posterior surface or base curve 12 into the RGP button 200. In the illustrated embodiment, the cavity 330 is empty. As discussed above, in one embodiment, said machining of the base curve 12 in the RGP button 200 can define a single optical zone to provide a single lens system. In another embodiment, said machining of the base curve 12 in the RGP button 200 can define multiple optical zones (e.g., dual zones) to provide a multiple lens system (e.g., dual lens system). FIG. 3 shows a cross-section of the cup 300 and RGP button 200, but one of skill in the art will recognize that said cross-sectional view, when rotated 360 degrees about its axis defines the entire cup 300 and RGP button 200.

Figure 4:
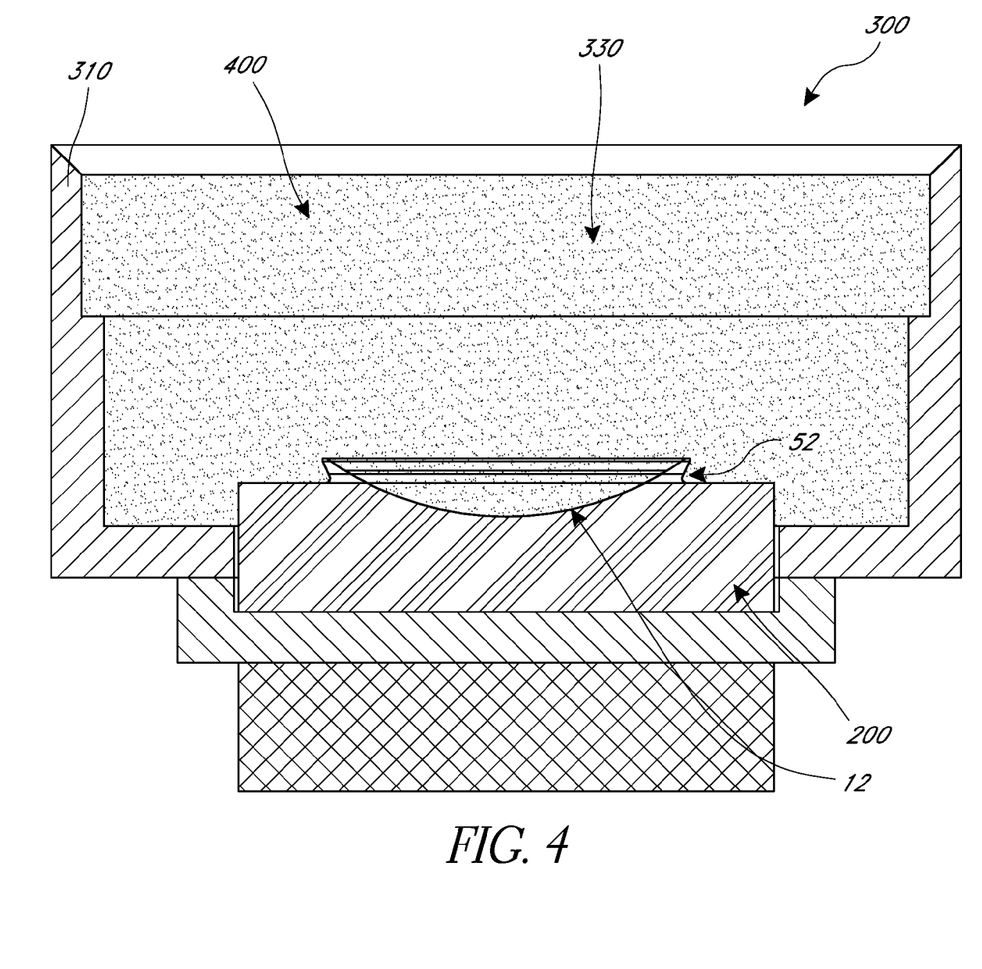
FIG. 4 shows another step in the manufacturing process of the hybrid contact lens of FIG. 1.

Optionally, a chemical agent (such as those described in U.S. Pat. Nos. 7,097,301, 7,163,292, 7,104,648, and 7,322,694 incorporated by reference) can be introduced into the cavity 300 so that it contacts the RGP button, including the base curve 12 and junction surface 52. In one embodiment, the chemical agent can facilitate preparation of the RGP material of the button 200 for bonding with the later introduced flexible material 400 (as shown in FIG. 4). In one embodiment, the chemical agent can be left in the cavity 330 for a predetermined period of time and then removed. In one embodiment, the longer the chemical agent remains in the cavity 330 the more it permeates through surfaces of the RGP button 200. In one embodiment, the period of time can be about 2 minutes. In another embodiment, the predetermined period of time can be about 1 minute. In still another embodiment, the predetermined period of time can be less than one minute. In still another embodiment, the step of introducing the chemical agent into the cavity 330 to treat the RGP button 200 can be excluded.

With reference to FIG. 4, the flexible material 400 is introduced into the cavity 330 so that it optionally fills the cavity 300, extends into the space defined by the base curve 12 in the RGP button 200 and adjacent the junction surface 52. The flexible material 400 is casted to allow it to solidify. FIG. 4 shows a cross-section of the cup 300 and RGP button 200, but one of skill in the art will recognize that said cross-sectional view, when rotated 360 degrees about its axis defines the entire cup 300 and RGP button 200.

Figure 5:
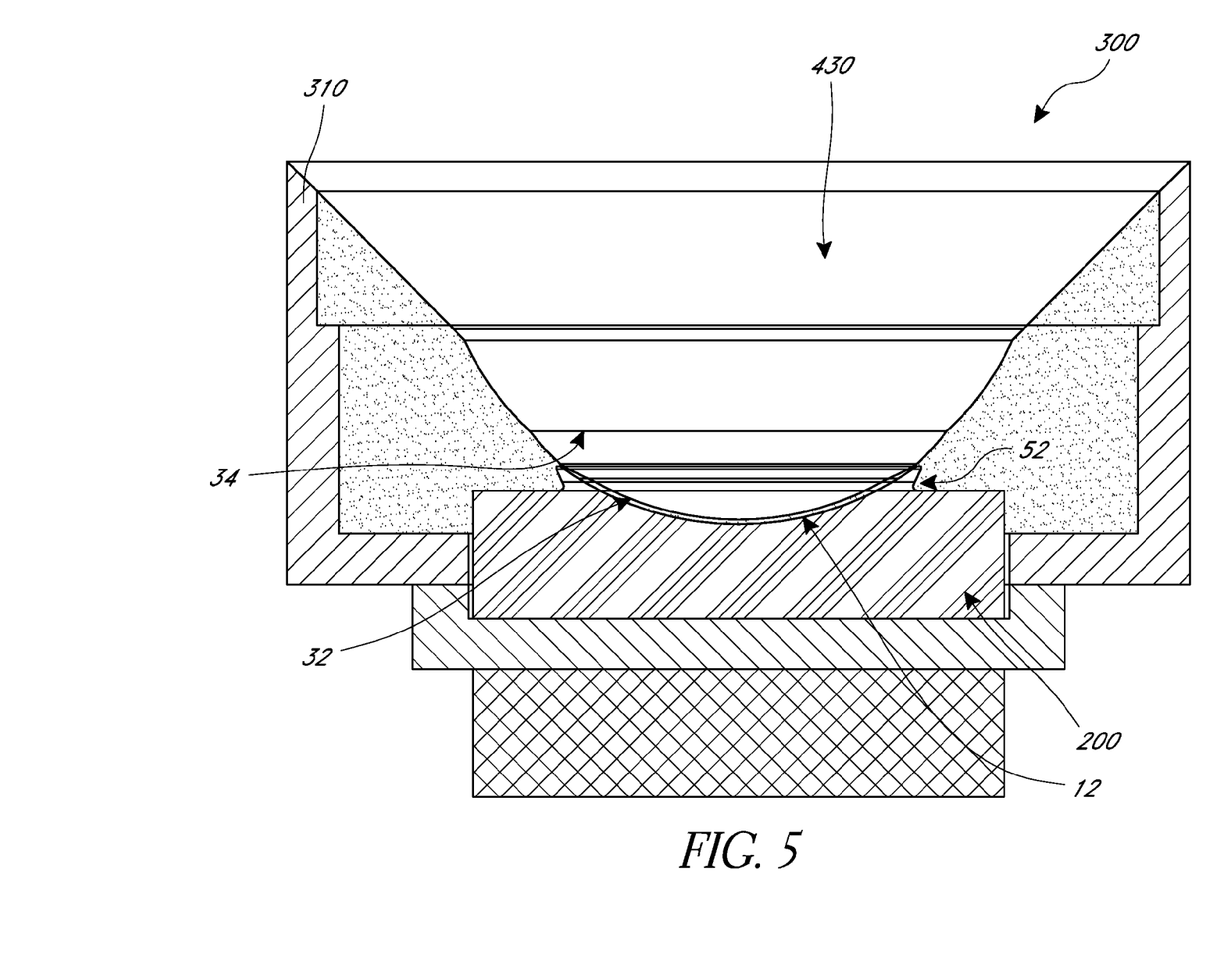
FIG. 5 shows another step in the manufacturing process of the hybrid contact lens of FIG. 1.

With reference to FIG. 5, the casted flexible material 400 is machined to define the posterior surface or base curve 32 (and outer boundary 34) of the flexible portion 30 of the hybrid contact lens 100. In one embodiment, a lathe can be used to machine the posterior surface or base curve 32 in the flexible material 400. FIG. 5 shows a cross-section of the cup 300 and RGP button 200, but one of skill in the art will recognize that said cross-sectional view, when rotated 360 degrees about its axis defines the entire cup 300 and RGP button 200, base curve 32 and outer boundary 34.

Once the base curve 32 has be machined, the front or anterior curve of the RGP button 200 and flexible material 400 can be machined, using processes known in the art, to produce the final hybrid contact lens 100.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A hybrid contact lens, comprising:
a lens body having
a rigid gas permeable (RGP) portion disposed generally at the center of the lens body, the RGP portion having a posterior surface defined by a base curve; and
a flexible portion extending outwardly from the RGP portion and defining an outer edge of the lens body,
wherein the flexible portion extends over the posterior surface of the RGP portion and defines a posterior surface and base curve of the lens body configured to contact a user's eye when wearing the hybrid contact lens, such that the RGP portion does not contact the user's eye when wearing the hybrid contact lens, and
wherein a ratio of a thickness of the RGP portion relative to a thickness of a section of the flexible portion disposed over the posterior surface of the RGP portion is between and including 2.1 to 1 and 5.8 to 1.

2. The hybrid contact lens of claim 1, wherein the ratio is between and including 2.1 to 1 and 3 to 1.

3. The hybrid contact lens of claim 1, wherein the ratio is between and including 3 to 1 and 5 to 1.

4. The hybrid contact lens of claim 1, wherein the thickness of the section of flexible portion disposed over the posterior surface of the RGP portion is about 50 microns.

5. The hybrid contact lens of claim 1, further comprising an optical, non-optical or medical device interposed between the posterior surface of the RGP portion and a section of the flexible portion that extends over the posterior surface of the RGP portion, so as to be encapsulated between the RGP portion and the flexible portion.

6. The hybrid contact lens of claim 1, wherein the base curve of the RGP portion and the base curve of the lens body are substantially the same.

7. The hybrid contact lens of claim 1, wherein the RGP portion has a gas permeability Dk value greater than 30 barrer.

8. The hybrid contact lens of claim 1, wherein the flexible portion has a gas permeability Dk value greater than 30 barrer.

9. The hybrid contact lens of claim 1, wherein a thickness of the flexible portion adjacent the posterior surface of the RGP portion is between about 50 microns and about 100 microns.

10. The hybrid contact lens of claim 1, wherein the RGP portion defines a circumferential junction surface that defines a peripheral junction with the flexible portion.

11. The hybrid contact lens of claim 1, wherein the ratio is between and including 5 to 1 and 5.8 to 1.

12. A hybrid contact lens, comprising:
   a lens body having
      a rigid gas permeable (RGP) portion disposed generally at the center of the lens body, the RGP portion having an anterior surface and a posterior surface defined by a base curve; and
      a flexible portion extending outwardly from the RGP portion and defining an outer edge of the lens body, the flexible portion having a section that extends over the posterior surface of the RGP portion, the flexible portion defining a posterior surface and base curve of the lens body configured to contact a user's eye when wearing the hybrid contact lens, such that the RGP portion does not contact the user's eye when wearing the hybrid contact lens,
   wherein a ratio of a thickness of the RGP portion relative to a thickness of the section of the flexible portion is between and including 2.1 to 1 and 5.8 to 1, and
   wherein the anterior surface of the RGP portion and an anterior portion of the flexible portion define a continuous anterior surface of the lens body.

13. The hybrid contact lens of claim 12, further comprising an optical, non-optical or medical device interposed between the posterior surface of the RGP portion and a section of the flexible portion that extends over the posterior surface of the RGP portion, so as to be encapsulated between the RGP portion and the flexible portion.

14. The hybrid contact lens of claim 12, wherein the thickness of the section of flexible portion disposed over the posterior surface of the RGP portion is about 50 microns.

15. The hybrid contact lens of claim 12, wherein the ratio is between and including 2.1 to 1 and 3 to 1.

16. The hybrid contact lens of claim 12, wherein the ratio is between and including 3 to 1 and 5 to 1.

17. The hybrid contact lens of claim 12, wherein the ratio is between and including 5 to 1 and 5.8 to 1.

* * * * *